United States Patent [19]

Schulze

[11] 4,033,939
[45] July 5, 1977

[54] STRESS-CRACK RESISTANT ETHYLENE-PERHALOETHYLENE TERPOLYMERS

[75] Inventor: Stephen R. Schulze, Gillette, N.J.

[73] Assignee: Allied Chemical Corporation, Morris Township, N.J.

[22] Filed: Jan. 19, 1976

[21] Appl. No.: 649,936

Related U.S. Application Data

[63] Continuation-in-part of Ser. No. 564,232, April 2, 1975.

[52] U.S. Cl. .................. 260/878 R; 260/897 C; 428/463; 526/89; 526/231; 526/249; 526/253; 526/255
[51] Int. Cl.[2] .............. C08F 214/04; C08F 214/26; C08L 23/08
[58] Field of Search ........ 260/80.77, 878 R, 897 C; 526/249, 253, 255

[56] References Cited
UNITED STATES PATENTS

| | | | |
|---|---|---|---|
| 3,624,250 | 11/1971 | Carlson | 260/80.77 |
| 3,817,951 | 6/1974 | Robinson | 260/80.77 |
| 3,847,881 | 11/1974 | Mueller et al. | 260/80.77 |

*Primary Examiner*—Harry Wong, Jr.
*Attorney, Agent, or Firm*—Roger H. Criss; Michael S. Jarosz

[57] ABSTRACT

Stress-crack resistant terpolymers of from about 40 to 60 mol percent ethylene, about 60 to 40 mol percent of a halogenated comonomer selected from the group consisting of tetrafluoroethylene, chlorotrifluoroethylene and mixtures thereof and about 0.1 to 10 mol percent of a termonomer selected from the group consisting of 3,3,3-trifluoro-2-trifluoromethyl propene, a vinyl monomer which is free of telogenic activity and which provides a side chain having at least two carbon atoms, the side chain being aromatic or having its elements bonded by a single bond only, and mixtures thereof, and containing high and low molecular weight components such that:

$$(1) \sum_{i=1}^{\infty} X_i \overline{M}w_i = f \cdot \overline{M}w, \text{ and}$$

$$(2) \ 0.02 \leq \frac{\overline{M}w \sum_{i=1}^{\infty} X_i}{\sum_{i=1}^{\infty} X_i \overline{M}w_i} \leq 0.6$$

wherein
$X_i$ represents the weight fraction of each high molecular weight component $i$;
$\overline{M}w$ represents the weight-average molecular weight of the terpolymer,
$\overline{M}w_i$ represents the weight-average molecular weight of each component $i$, $$\overline{M}w = \sum_{i=1}^{\infty} X_i \overline{M}w_i + \sum_{j=1}^{\infty} X_j \overline{M}w_j,$$

wherein
$X_j$ represents the weight fraction of each low molecular weight component $j$;
$\overline{M}w_j$ represents the weight-average molecular weight of each component $j$, and
$0.1 \leq f \leq 0.95$.

23 Claims, No Drawings

STRESS-CRACK RESISTANT ETHYLENE-PERHALOETHYLENE TERPOLYMERS

CROSS-REFERENCE TO RELATED APPLICATIONS

This application is a continuation-in-part of copending U.S. application Ser. No. 564,232 filed Apr. 2, 1975.

BACKGROUND OF THE INVENTION

1. Field of the Invention

This invention relates to stress-crack resistant ethylene-perhaloethylene polymers, particularly polymers of about 40 to 60 mol percent of ethylene with from about 40 to 60 mol percent of chlorotrifluoroethylene, tetrafluoroethylene or mixtures thereof and to a process for their preparation.

2. Description of the Prior Art

Copolymers of about 40 to about 60 mol percent of ethylene with correspondingly from about 60 to about 40 mol percent chlorotrifluoroethylene, tetrafluoroethylene or mixtures thereof are known in the art and are disclosed, for example, in U.S. Pat. No. 3,847,881 issued in 1974 to Mueller et al. While such copolymers have high melting points, generally in the order of about about 200° C, their use at temperatures above about 150° C has been severely restricted due to their tendency to thermal stress-crack at such temperatures. At such temperatures, the copolymers exhibit cracks under tensile stresses appreciably below the limits of their short-term strength, especially when powder coated onto metal substrates.

To overcome the thermal stress-cracking tendency of such copolymers, it has been suggested in the aforementioned copending application to provide such copolymers with high and low molecular weight components in specified amounts. Although such modified copolymers exhibit high resistance to thermal stress-cracking, it would be desirable to further improve the high temperature properties of such copolymers without adversely affecting other desirable properties.

SUMMARY OF THE INVENTION

In accordance with the present invention, there are provided terpolymers of from about 40 to about 60 mol percent ethylene, about 60 to about 40 mol percent of a halogenated comonomer selected from the group consisting of tetrafluoroethylene, chlorotrifluoroethylene and mixtures thereof and about 0.1 to 10 mol percent of a termonomer selected from the group consisting of 3,3,3-trifluoro-2-trifluoromethyl propene, a vinyl monomer which is free of telogenic activity and which provides a side chain having at least two carbon atoms, the side chain being aromatic or having its elements bonded by a single bond only, and mixtures thereof, and containing high and low molecular weight components such that the following equations are satisfied:

(1) $\sum_{i=1}^{\infty} X_i \overline{M}w_i = f \cdot \overline{M}w$, and (2) $0.02 \leq \dfrac{\overline{M}w \sum_{i=1}^{\infty} X_i}{\sum_{i=1}^{\infty} X_i \overline{M}w_i} \leq 0.6$ wherein
$X_i$ represents the weight fraction of each high molecular weight component $i$;
$\overline{M}w$ represents the weight-average molecular weight of the terpolymer,
$\overline{M}w_i$ represents the weight-average molecular weight of each component $i$, $$\overline{M}w = \sum_{i=1}^{\infty} X_i \overline{M}w_i + \sum_{j=1}^{\infty} X_j \overline{M}w_j,$$

wherein
$X_j$ represents the weight fraction of each low molecular weight component $j$,
$\overline{M}w_j$ represents the weight-average molecular weight of each component $j$, and
$0.1 \leq f \leq 0.95$.

It has been found that the terpolymers of this invention exhibit synergistically improved high temperature properties and are useful in a variety of applications, especially as jacketing for wires and cables.

Also in accordance with this invention, such terpolymers are provided by a process which comprises initially contacting under polymerization conditions, ethylene, in an amount sufficient to provide the desired weight fraction of the high molecular weight component of the copolymer, with a weight excess of the halogenated monomer, and said terpolymer, conducting the polymerization reaction to provide a mixture of the terpolymer and remaining monomer, adding a chain transfer agent to the mixture and contacting the mixture, under polymerization conditions, with an additional amount of ethylene sufficient to provide the desired weight fraction of the low molecular weight component of the terpolymer.

In accordance with a preferred embodiment of this invention, there are provided terpolymers of from about 40 to about 60 mol percent, preferably about 45 to about 55 mol percent, of ethylene and from about 60 to about 40 mol percent, preferably about 55 to about 45 mol percent, of a halogenated comonomer selected from the group consisting of tetrafluoroethylene, chlorotrifluoroethylene and mixtures thereof, and about 0.1 to 10 mol percent of a termonomer selected from the group consisting of 3,3,3-trifluoro-2-trifluoromethyl propene, a vinyl monomer which is free of telogenic activity and which provides a side chain having at least two carbon atoms, the side chain being aromatic or having its elements bonded by a single bond only, and mixtures thereof, preferably about 0.5 to 5 mol percent of said termonomer, which terpolymers contain from about 0.5 to 40 weight percent of a high molecular weight fraction having a melt index, as hereinafter defined, of from about 0.0001 to 1.0. That is, such terpolymers have a wider molecular weight distribution than terpolymers of such termonomers which have heretofore been suggested. In particular, the terpolymers preferably include on a weight basis from about 0.5 to about 60%, more preferably about 5 to about 50%, and most preferably about 15 to about 50% of a high molecular weight terpolymer fraction which has a melt index of from about 0.0001 to about 1.0, preferably about 0.005 to about 0.5, most preferably about 0.005 to about 0.2. In this embodiment, the terpolymers correspondingly contain from about 40 to about 99.5, more preferably from about 50 to about 95, and most preferably from about 50 to about 85, weight percent of a low molecular weight fraction which has a melt index in the range of about 3 to 3000, preferably about 5 to 1000 and most preferably about 5 to 100. The overall melt index of the terpolymer may be in the range of about 0.05 to 50, preferably about 0.1 to 35 and most preferably about 0.2 to 15.

DESCRIPTION OF THE PREFERRED EMBODIMENTS

As discussed above, the terpolymers of this invention contain about 40 to 60, preferably about 45 to 55, mol percent of ethylene, about 40 to 60, preferably about 45 to 55, mol percent of chlorotrifluoroethylene, tetrafluoroethylene or mixtures thereof, and about 0.1 to 10, preferably 0.5 to 5, mol percent of the termonomer. The termonomer is selected from the group consisting of 3,3,3-trifluoro-2-trifluoromethyl propene, a vinyl monomer which is free of telogenic activity and which provides a side chain having at least two carbon atoms, the side chain being aromatic or having its elements bonded by a single bond only, and mixtures thereof. Such termonomers are disclosed in the aforesaid Mueller et al. patent and in U.S. Pat. No. 3,624,250 issued in 1971 to Carlson. The vinyl monomers are disclosed in the Carlson patent. By "free of telogenic activity" is meant that the vinyl monomer does not act as a chain transfer agent to an extent which undesirably limits the molecular weight of the copolymer. Examples of such vinyl monomers include fluorinated alpha-monoolefins and those of the following formulae:

$R-CF=CF_2$; $ROCF = CF_2$; $CF_3(CF_2)_mCH_2OCF=CF_2$; $CH_3(CH_2)_nOCF = CF_2$; $R'CH_1(X) = CH_2$ and $R_2OCH_2C(X) = CH_2$, wherein R is an organic group containing 2 to 8 carbon atoms, R' is a perfluorinated or chlorofluoroalkyl group of 1 to 7 carbon atoms or a secondary or tertiary halo-alcohol group, $R_2$ is a perfluorinated or chlorofluoroalkyl of 1 to 7 carbon atoms, X is H or $CH_3$, $m$ is an integer of 0 to 6 and $n$ is an integer of 1 to 7. Especially preferred vinyl monomers are perfluoropropyl perfluorovinyl ether, 1,1,1-trifluoro-2-(trifluoromethyl)-4-penten-2-ol and an allyl heptafluoroisopropyl ether. The preferred termonomer is 3,3,3-trifluoro-2-trifluoromethyl propene (sometimes referred to herein as hexafluoroisobutylene or HFIB).

The terpolymers of the present invention may be prepared using known polymerization methods such as are described in the aforesaid copending application, the disclosure of which is expressly incorporated herein, modified as described below. In such polymerizations, the terpolymers may be incorporated in a manner described in the aforesaid Mueller et al. and Carlson patents. These methods include the polymerization of ethylene with chlorotrifluoroethylene and the termonomer in a stirred aqueous medium at superatmospheric pressure using benzoyl peroxide as catalyst; using a radiation catalyst at 0° C; and by bulk polymerization temperatures between about −80° to +50° C using oxygen-activated alkyl boron or other boron-containing catalysts. Preferably, terpolymers including chlorotrifluoroethylene or also containing tetrafluoroethylene are prepared by batchwise bulk copolymerization of the monomers at temperatures between about −20 and + 20° C, at superatmospheric pressure in an agitated pressure vessel, preferably in the presence of inert chlorofluorocarbon solvent, by charging the vessel with liquid chlorofluoroethylene monomer and/or tetrafluoroethylene monomer and the termonomer and admitting gaseous ethylene into the vessel, using polymerization initiators effective at such temperatures, such as organic peroxides (e.g. trifluoroacetyl peroxide). For terpolymers containing tetrafluoroethylene, similar conditions can be employed except that the temperature preferably ranges from about 30° to 85° C. The terpolymers of the present invention may also be prepared by polymerization in aqueous suspension or dispersion using known techniques.

In further accordance with the preferred embodiment of this invention, a pressure vessel is charged with the appropriate liquid halogenated monomer(s) and termonomer and the requisite amount of ethylene gas calculated to provide the approximately desired weight fraction of the high molecular weight portion of the copolymer is admitted into the pressure vessel, after which a chain transfer agent, such as chloroform, heptane, cyclohexane or the like, is added. Alternatively, a small additional amount of chain transfer agent may initially be present. Thereafter, the remainder of the ethylene (and any termonomer) to be reacted is admitted into the vessel. The chain transfer agent serves to terminate the reaction with respect to formation of the high molecular weight portion of the terpolymer and results in the formation of the low molecular weight portion which has a reduced chain length.

The high molecular weight portion of the terpolymer may comprise one or more high molecular weight components. The sum of the products of each weight fraction of a high molecular weight component times the weight-average molecular weight of that component is a function of the weight-average molecular weight of the terpolymer, as is expressed in the following equation:

$$\sum_{i=1}^{\infty} X_i \bar{M} w_i = f \cdot \bar{M} w \qquad (1)$$

wherein $i$ represents each high molecular weight component, $X_i$ represents the weight fraction of each high molecular weight component, $\bar{M}w_i$ represents the weight-average molecular weight of each component $i$, $\bar{M}w$ represents the total weight-average molecular weight of the terpolymer and $$0.1 \leq f \leq 0.95.$$

Preferably $f$, which is the fraction of the weight-average molecular weight of the blend contributed by the high molecular weight components, is greater than or equal to 0.3 and less than or equal to 0.9, most preferably greater than or equal to 0.5 and less than or equal to 0.9. If $f$ is less than 0.1, no significant advantage is noticed in stress-crack resistance. If $f$ is more than 0.95, a uniform melt blend cannot be obtained due to the large difference in melt viscosities between the high and low molecular weight components.

In addition, the low molecular weight portion of the terpolymer may also comprise one or more low molecular weight components. Thus, the weight-average molecular weight of the polymer is given by the equation:

$$\bar{M}w = \sum_{i=1}^{\infty} X_i \bar{M}w_i + \sum_{j=1}^{\infty} X_j \bar{M}w_j \qquad (2)$$

wherein $j$ represents each low molecular weight component, $X_j$ represents the weight fraction of each low molecular weight component and $\overline{Mw}_j$ represents the weight-average molecular weight of each component $j$.

Moreover, the ratio of the weight-average molecular weight of the terpolymer to the weight-average molecular weight of the high molecular weight components of the terpolymer is as follows:

$$0.02 \leq \frac{\overline{Mw}}{\left\{\dfrac{\sum_{i=1}^{\infty} X_i \overline{Mw}_i}{\sum_{i=1}^{\infty} X_i}\right\}} \leq 0.6 \quad (3)$$

The ratio can also be expressed as:

$$\frac{\overline{Mw} \sum_{i=1}^{\infty} X_i}{\sum_{i=1}^{\infty} X_i \overline{Mw}_i} \quad (4)$$

Preferably this ratio is greater than or equal to 0.04 and less than or equal to 0.5 and most preferably is greater than or equal to 0.08 and less than or equal to 0.4.

If this ratio is less than 0.02, a uniform melt blend cannot be obtained due to the large difference in melt viscosities between the high and low molecular weight components, whereas if the ratio is more than 0.6, no significant advantage in stress-crack resistance is noticed.

For more than two molecular weight components, the high molecular weight components are defined as the highest molecular weight component and any member of the next lower components, in descending order of molecular weight, such that any combination of all of the high molecular weight components satisfy equations 1 and 3.

This can be illustrated by assuming the following hypothetical molecular weight components of a terpolymer: one component of 350,000 weight-average molecular weight, another of 300,000, a third of 200,000 and a fourth of 50,000. The high molecular weight components include (a) the 350,000 component; (b) may include the 300,000 component if, in combination with the 350,000 component, equations 1 and 3 are satisfied; (c) may also include the 200,000 component if, in combination with both of the 350,000 and 300,000 components, equations 1 and 3 are satisfied and (d) does not include the lowest molecular weight component, 50,000.

In a preferred embodiment of this invention, the terpolymer comprises a single high molecular weight component and a single low molecular weight component and the total melt index of the terpolymer is between about 0.05 to 50, preferably about 0.1 to 35 and more preferably about 0.2 to 15. In this case, the high molecular weight fraction has a melt index of about 0.0001 to 1.0, preferably about 0.005 to 0.5 and more preferably about 0.005 to 0.2. Correspondingly, the low molecular weight fraction has a melt index in the range of about 3 to 3000, preferably about 5 to 1000, and most preferably 5 to 100. The term "melt index" as used herein refers to the amount, in grams, of the terpolymer that can be forced through a 0.0825 inch orifice when subjected to a 2160 gram force in ten minutes at 275° C. (ASTM D-1238).

The relationship between the melt index and the weight-average molecular weight for various polymers and copolymers is known or can be determined. The relationship for ethylene-chlorotrifluoroethylene copolymers is given as follows:

$$\overline{Mw} = \frac{133,000}{MI^{0.27}} \quad (5)$$

wherein $\overline{Mw}$ is the weight-average molecular weight and MI is the melt index. The melt index of the high molecular weight portion of the terpolymer can be determined from the following equation by measuring the melt indices of the low molecular weight portion and the overall copolymer:

$$MI_H{}^{0.27} = \frac{X_H}{\dfrac{1}{MI^{0.27}} - \dfrac{(1 - X_H)}{MI_L{}^{0.27}}} \quad (6)$$

wherein $MI_L$ is the melt index of the low molecular weight portion; $MI_H$ is the melt index of the high molecular weight portion; $MI$ is the overall melt index of the terpolymer and $X_H$ is the weight fraction of the high molecular weight portion. $MI_L$ may be estimated from the amount of chain transfer agent employed based upon polymerization reactions for the terpolymers not containing a high molecular weight fraction.

The terpolymers of this invention exhibit excellent high temperature stress-crack resistance and elongation. Indeed, such properties are unexpectedly improved over similar copolymers containing a high molecular weight faction or containing the termonomer alone.

To further illustrate the present invention, the following non-limiting examples are given:

A. TERPOLYMER PREPARATION

EXAMPLE 1

66L deionized water were charged to a 40 gallon, glass-lined reactor. After air evacuation, 19L methanol, 11.3kg chlorotrifluoroethylene, 22.5g chloroform, and 49g hexafluoroisobutylene were also charged to the reactor. At 10° C, and with agitation, sufficient ethylene was fed to bring the reactor pressure up to 170 psig. The reaction was initiated by the addition of 3g trichloroacetyl peroxide, and additional peroxide was added in 0.5g increments about every 6 minutes to maintain the polymerization. As the reaction proceeded, additional ethylene was continuously fed to the reactor to maintain a pressure of 170 psig. Additional hexafluoroisobutylene was fed continuously in the amount equal to 5.9% of the ethylene fed. After 340g of the additional ethylene had been fed, 90g additional chloroform were charged. The total reaction time was 6 hours, or until 1.45kg total additional ethylene was fed. After the polymerization, the polymer was separated from the water-methanol solution by filtration and then dried. The yield was 10kg. The melt index (MI) of the terpolymer was 1.2.

Based on the relative amounts of ethylene added before and after chloroform addition, the terpolymer had 23.4 wt. % high molecular weight portion (estimated $\overline{Mw}$ of 280,000 and MI of 0.059) and 76.6 wt. % of low molecular weight portion of MI 7.3 (estimated $\overline{M}w$ of 78,000). The product contained 50 mol % ethylene, 49.5 mol % chlorotrifluoroethylene, and 0.5 mol % hexafluoroisobutylene.

EXAMPLE 2 (Comparative)

The polymerization was carried out as in Example 1, except that 64.5g chloroform was charged to the reactor before the catalyst addition was made, and no additional chloroform was charged. The product melt index was 0.71. The product contained 49 mol % ethylene, 50.5 mol % chlorotrifluoroethylene, and 0.5 mol % hexafluoroisobutylene.

EXAMPLE 3 (Comparative)

The polymerization was carried out as in Example 2, except that 88.5g chloroform was charged. The product melt index was 1.9. The polymer composition was the same as in Example 2.

EXAMPLE 4

The polymerization was carried out as in Example 1, except that 26g chloroform was charged to the reactor before the catalyst addition was made, and 100g additional chloroform was charged after 259g of the continuous ethylene had been fed. The initial amount of hexafluoroisobutylene was 98g, and the continuous amount charged was 11.7% of the ethylene fed.

The melt index was 2.7. The product had 17.8% high molecular weight portion (estimated $\overline{M}w$ of 250,000 and MI of 0.1) and 82.2% of low molecular weight portion of MI 10.3 (estimated $\overline{M}w$ of 71,000). The product contained 50 mol % ethylene, 49.0 mol % chlorotrifluoroethylene, and 1.0 mol % hexafluoroisobutylene.

EXAMPLE 5 (Comparative)

The polymerization was carried out as in Example 4, except that 89g chloroform was charged to the reactor before the catalyst addition was made, and no additional chloroform was charged. The product melt index was 2.6. The product contained 50 mol % ethylene, 49 mol % chlorotrifluoroethylene, and 1.0 mol % hexafluoroisobutylene.

EXAMPLE 6

The polymerization was carried out as in Example 1, except that 34kg chlorotrifluoroethylene, 90g chloroform, and 440g hexafluoroisobutylene were charged to the reactor before the addition of 10g catalyst. After 1425g continuous ethylene had been charged, 208g additional chloroform was charged. Also, additional hexafluoroisobutylene was fed continuously in the amount equal to 17.2% of the ethylene fed. The total reaction time was 11 hours, or until 4.36kg total additional ethylene was fed. The yield was 30kg. The melt index of the terpolymer was 0.67. The product had 32.7% high molecular weight portion (estimated $\overline{M}w$ of 275,000 and MI of 0.067) and 67.3% of low molecular weight portion of MI 5.0 (estimated $\overline{M}w$ of 86,000). The product contained 49.5 mol % ethylene, 49 mol % chlorotrifluoroethylene, and 1.5 mol % hexafluoroisobutylene.

EXAMPLE 7

The polymerization was carried out as in Example 6, except that the initial chloroform charge was 85g, and the second chloroform charge was 186g made after 2.02kg continuous ethylene had been fed. Also, the reaction was continued until 5.2kg total continuous ethylene had been fed. The yield was 35.5kg terpolymer with a melt index of 0.50. The product had 39% high molecular weight portion (estimated $\overline{M}w$ of 300,000 and MI of 0.050) and 61% of low molecular weight portion of MI 9.6 (estimated $\overline{M}w$ of 72,000). The product contained 50 mol % ethylene, 48.5 mol % chlorotrifluoroethylene, and 1.5 mol % hexafluoroisobutylene.

EXAMPLE 8 (Comparative)

The polymerization was carried out as in Example 6, except that 180g chloroform was charged before the catalyst addition was made and no additional chloroform was charged. The product melt index was 0.5. The product contained 50.5 mol % ethylene, 48 mol % chlorotrifluoroethylene, and 1.5 mol % hexafluoroisobutylene.

EXAMPLE 9 (Comparative)

Example 7 was repeated except that no hexafluoroisobutylene was added and the amount of chloroform and reaction conditions were adjusted to provide an ethylene-chlorotrifluoroethylene copolymer having high and low molecular weight fractions.

EXAMPLE 10 (Comparative)

Example 9 was repeated except that the initial chloroform charged was 180 g and no additional amounts of chloroform were added. The resulting copolymer did not have a high molecular weight fraction.

B. WIRE AND CABLE TESTS

The products of Example 1–8 were extruded at about 285° C onto a 14 AWG braided copper wire to a coating thickness of 20 mils. The samples were subjected to a Wire Stress Crack Temperature Test which consisted of first heating the wire at the test temperature in a straight configuration for about 16 hours, then cooling the wire, coiling it around a cylinder of its same diameter and reheating for 4 hours at the test temperature. The test is performed at successively higher temperatures until a temperature is reached at which cracks appear in the coating. This temperature is referred to as the Wire Stress Crack Temperature and is reported in Table I, below.

The products of Examples 1–10 were also subjected to elongation tests at 180° C in accordance with ASTM D-1708. The results are also reported in Table I.

The products of Examples 6–8 were also extruded at about 285° C to a coating thickness of 20 mils onto a cable core comprising seven insulated 14 AWG copper wires which were wrapped with polyethylene terephthalate film tape. The coated cables were subjected to a Cable Jacket Stress Crack Temperature Test which consisted of an initial heating in a straight configuration for about 2 hours, cooling the cable, coiling it around a cylinder of 3 times its diameter and reheating for about 2 hours at the test temperature. The test is performed at successively higher temperatures until cracks appear in the jacket coating. This temperature is referred to as the Cable Stress Crack Temperature and is reported in Table I.

TABLE 1

| Example | HFIB mol % | Melt Index | % High Mw | Melt Index High Mw | f | Melt Index Low Mw | Elongation % at 180° C | Wire Stress Crack Temp. °C | Cable Stress Crack Temp. °C |
|---|---|---|---|---|---|---|---|---|---|
| 1 | 0.5 | 1.2 | .234 | .059 | 0.52 | 7.3 | 255 | 200 | — |
| 2 | 0.5 | 0.71 | — | — | — | — | 161 | 190 | — |
| 3 | 0.5 | 1.9 | — | — | — | — | 71 | 180 | — |
| 4 | 1.0 | 2.7 | .178 | .10 | 0.44 | 10.3 | 120 | 200 | — |
| 5 | 1.0 | 2.6 | — | — | — | — | 78 | 180 | — |
| 6 | 1.5 | 0.67 | .327 | .067 | 0.61 | 5.0 | 456 | >210 | 190 |
| 7 | 1.5 | 0.50 | .39 | .050 | 0.73 | 9.6 | 619 | >210 | 200 |
| 8 | 1.5 | 0.50 | — | — | — | — | 210 | 200 | 160 |
| 9 | 0 | 0.50 | .47 | .054 | 0.88 | 67 | 205 | — | — |
| 10 | 0 | 0.50 | — | — | — | — | 120 | — | — |

Table I demonstrates the beneficial results of the hexafluoroisobutylene terpolymer which contains high and low molecular weight components in accordance with this invention. Example 1 (0.5% HFIB) shows an increase in the high temperature elongation of 94% and 184% in comparison with comparative Examples 2 and 3, respectively, which contained the same amount of HFIB termonomer but no high molecular weight component. Also, it can be seen that Example 1 demonstrates a 10° and 20° C improvement in the Wire Stress Crack Temperature compared with Examples 2 and 3, respectively. Similarly, Example 4 (1.0% HFIB) evidences a 44% increase in high temperature elongation and a 20° C increase a stress crack temperature in comparison to Example 5. Examples 6 and 7 (1.5% HFIB) had 246% and 409%, respectively, higher elongations and 30° and 40° C, respectively, higher cable stress crack temperatures than comparative Example 8.

By comparing Examples 9 and 10, it can be seen that the high temperature elongation is increased an additional 85% by the presence of the high molecular weight fraction and by comparing Examples 8 and 10, it can be seen that the presence of hexafluoroisobutylene increases the high temperature elongation by 90%. Thus, the combined additive effects of providing a high molecular weight fraction in a hexafluoroisobutylene-containing terpolymer would be expected to be in the range of about 175%. Thus, it would have been expected that the combination of such techniques would have provided a terpolymer with a high temperature elongation of about 295% (the addition of 175% to the 120% base of Example 10). However, a true synergistic effect has been discovered since the actually measured elongation of such terpolymer is over 600% (Example 7).

Accordingly, it can be seen that the incorporation of a high molecular weight fraction and a termonomer significantly increases the elongation and stress crack resistance of the polymers.

EXAMPLE 11

Example 1 is repeated except that perfluoropropyl perfluorovinyl ether is substituted for the hexafluoroisobutylene. Similar results are noted.

EXAMPLE 12

Example 1 is repeated except that tetrafluoroethylene is substituted for the chlorotrifluoroethylene. Similar results are noted.

The terpolymers of the present invention exhibit outstanding mechanical, electrical and chemical properties at high temperatures in addition to their high temperature stress-crack resistance. As such, they are particularly suitable for making a variety of useful articles, such as valves, gaskets, pipes, wire and cable insulation, sheets and films. They can be coated onto many different substances by conventional processes, such as powder or fluidized bed coating. An especially advantageous use is in insulation coatings or jackets for wires and cables.

The terpolymers may contain conventional additives, such as heat stabilizers, cross-linking agents, fillers, reinforcing agents, including glass fibers and the like, pigments, etc. as is suitable for specific applications. For example, the stabilizing systems described in U.S. Pat. No. 3,745,145 to Khattab et al. and U.S. Pat. No. 3,773,698 to Khattab, issued in 1973, may be employed.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. Terpolymers of from about 40 to 60 mol percent ethylene, from about 60 to about 40 mol percent of a halogenated comonomer selected from the group consisting of tetrafluoroethylene, chlorotrifluoroethylene and mixtures thereof and about 0.1 to 10 mol percent of a termonomer selected from the group consisting of 3,3,3-trifluoro-2-trifluoromethyl propene, a vinyl monomer selected from the group consisting of fluorinated alpha-monoolefins, and monomers of the formula $R-CF=CF_2$; $ROCF=CF_2$; $CF_3(CF_2)_mCH_2OCF=CF_2$; $CH_3(CH_2)_nOCF=CF_2$; $R'CH_2(X)=CH_2$ and $R_2OCH_2C(X)=CH_2$, wherein R is an organic group containing 2 to 8 carbon atoms, R' is a perfluorinated or chlorofluoroalkyl group of 1 to 7 carbon atoms or a secondary or tertiary halo-alcohol group, $R_2$ is a perfluorinated or chlorofluoroalkyl of 1 to 7 carbon atoms, X is H or $CH_3$, m is an integer of 0 to 6 and n is an integer of 1 to 7, and mixtures thereof, and containing high and low molecular weight components of said terpolymers such that equations (1) and (2) are satisfied:

(1) $\sum_{i=1}^{\infty} X_i \bar{M}w_i = f \cdot \bar{M}w$, and (2) $0.02 \leq \dfrac{\bar{M}w \sum_{i=1}^{\infty} X_i}{\sum_{i=1}^{\infty} X_i \bar{M}w_i} \leq 0.6$ wherein
$X_i$ represents the weight fraction of each high molecular weight component,
$\overline{Mw}$ represents the weight-average molecular weight of the terpolymer,
$\overline{Mw}_i$ represents the weight-average molecular weight of each component $i$, $$\overline{Mw} = \sum_{i=1}^{\infty} X_i \overline{Mw}_i + \sum_{j=1}^{\infty} X_j \overline{Mw}_j,$$

wherein
$X_j$ represents the weight fraction of each low molecular weight component,
$\overline{Mw}_j$ represents the weight-average molecular weight of each component $j$, and
$0.1 \leq f \leq 0.95$, the high molecular components having a weight-average molecular weight, expressed in terms of melt index of from about 0.0001 to 1.0 and the low molecular weight components having a weight-average molecular weight, expressed in terms of melt index of from about 3 to 3000
and therefore wherein said terpolymers contain from 0.2 to 57 weight percent of said high molecular weight components and from 99.8 to 43 weight percent of said low molecular weight components.

2. Terpolymers in accordance with claim 1 wherein said halogenated comonomer is chlorotrifluoroethylene.

3. Terpolymers in accordance with claim 2 containing from about 5 to about 50 weight percent of a high molecular weight component which has a melt index of from about 0.005 to about 0.5.

4. Terpolymers in accordance with claim 3 wherein said high molecular weight component has a melt index in the range of about 0.005 to about 0.2.

5. Terpolymers in accordance with claim 4 containing from about 45 to about 55 mol percent of ethylene, from about 55 to about 45 mol percent of chlorotrifluoroethylene and wherein said termonomer is 3,3,3-trifluoro-2-trifluoromethyl propene.

6. Terpolymers in accordance with claim 5 wherein said termonomer is present in an amount of about 0.5 to 5 mol percent.

7. Terpolymers in accordance with claim 1 wherein $$0.3 \leq f \leq 0.9 \text{ and } 0.08 \leq \frac{\overline{Mw} \sum_{i=1}^{\infty} X_i}{\sum_{i=1}^{\infty} X_i \overline{Mw}_i} \leq 0.6 \ .$$

8. Terpolymers of from about 40 to 60 mol percent ethylene and from about 60 to 40 mol percent of a halogenated comonomer selected from the group consisting of tetrafluoroethylene, chlorotrifluoroethylene and mixtures thereof and about 0.1 to 10 mol percent of a termonomer selected from the group consisting of 3,3,3-trifluoro-2-trifluoromethyl propene, a vinyl monomer selected from the group consisting of fluorinated alphamonoolefins, and monomers of the formula $R-CF=CF_2$; $ROCF=CF_2$; $CF_3(CF_2)_mCH_2OCF=CF_2$; $CH_3(CH_2)_nOCF=CF_2$; $R'CH_2(X)=CH_2$ and $R_2OCH_2C(X)=CH_2$, wherein R is an organic group containing 2 to 8 carbon atoms, R' is a perfluorinated or chlorofluoroalkyl group of 1 to 7 carbon atoms or a secondary or tertiary halo-alcohol group, $R_2$ is a perfluorinated or chlorofluoroalkyl of 1 to 7 carbon atoms, X is H or $CH_3$, m is an integer of 0 to 6 and n is an integer of 1 to 7, and mixtures thereof, and containing from about 0.5 to about 60 weight percent of a high molecular weight fraction which has a melt index of from about 0.0001 to 1.0 and from about 40 to about 99.5 weight percent of a low molecular weight fraction having a melt index of from about 3 to 3000.

9. Terpolymers in accordance with claim 8 wherein said halogenated comonomer is chlorotrifluoroethylene.

10. Terpolymers in accordance with claim 9 containing from about 5 to about 50 weight percent of a high molecular weight fraction which has a melt index of from about 0.005 to about 0.5.

11. Terpolymers in accordance with claim 10 in which said high molecular weight fraction has a melt index in the range of about 0.005 to about 0.2 and said low molecular weight fraction has a melt index of about 5 to 100.

12. Terpolymers in accordance with claim 11 containing from about 45 to about 55 mol percent of ethylene and correspondingly from about 55 to about 45 mol percent of chlorotrifluoroethylene.

13. Terpolymers in accordance with claim 12 containing from about 0.5 to 5 mol percent of 3,3,3-trifluoro-2-trifluoromethyl propene.

14. Terpolymers in accordance with claim 8 wherein said halogenated comonomer is chlorotrifluoroethylene.

15. Terpolymers in accordance with claim 14 containing from about 5 to about 50 weight percent of a high molecular weight fraction having a melt index in the range of about 0.005 to about 0.5.

16. Terpolymers in accordance with claim 8 wherein said halogenated comonomer is tetrafluoroethylene.

17. A process of preparing stress-crack resistant terpolymers of from about 40 to about 60 mol percent ethylene, from about 60 to about 40 mol percent of a halogenated comonomer selected from the group consisting of tetrafluoroethylene, chlorotrifluoroethylene and mixtures thereof, and about 0.1 to 10 mol percent of a termonomer selected from the group consisting of 3,3,3-trifluoro-2-trifluoromethyl propene, a vinyl monomer selected from the group consisting of fluorinated alpha-monoolefins, and monomers of the formula $R-CF=CF_2$; $ROCF=CF_2$; $CF_3(CF_2)_mCH_2OCF=CF_2$; $CH_3(CH_2)_nOCF=CF_2$; $R'CH_2(X)=CH_2$ and $R_2OCH_2C(X)=CH_2$, wherein R is an organic group containing 2 to 8 carbon atoms, R' is a perfluorinated or chlorofluoroalkyl group of 1 to 7 carbon atoms or a secondary or tertiary halo-alcohol group, $R_2$ is a perfluorinated or chlorofluoroalkyl of 1 to 7 carbon atoms, X is H or $CH_3$, m is an integer of 0 to 6 and n is an integer of 1 to 7, and mixtures thereof, said process comprising forming a terpolymer containing a high molecular weight component present in a desired weight fraction and having a melt index in the range of about 0.0001 to 1.0 and a low molecular weight component having a melt index of from about 3 to 3000, by initially contacting under polymerization conditions ethylene, in an amount sufficient to provide the desired weight fraction of said high molecular weight component, with a weight excess of a halogenated monomer selected from the group consisting of tetrafluoroethylene, chlorotrifluoroethylene, and mixtures thereof, and about 0.1 to 10 mol percent of a termonomer selected from the group consisting of 3,3,3-trifluoro-2-trifluoromethyl propene, said vinyl monomers and mixtures thereof, conducting said polymerization to provide said high molecular weight component of said terpolymer in a reaction mixture, adding a chain transfer agent to said mixture after formation of said high molecular weight component and contacting said mixture, under polymerization conditions, with an additional amount of ethylene to provide said low molecular weight component, said high and low molecular weight components being chosen such that the following equations are satisfied:

(1) $\sum_{i=1}^{\infty} X_i \overline{M}w_i = f \cdot \overline{M}w$, and (2) $0.02 \leq \dfrac{\overline{M}w \sum_{i=1}^{\infty} X_i}{\sum_{i=1}^{\infty} X_i \overline{M}w_i} \leq 0.6$ wherein $X_i$ represents the weight fraction of each high molecular weight component $i$;

$\overline{M}w$ represents the weight-average molecular weight of the terpolymer, $\overline{M}w_i$ represents the weight-average molecular weight of each component $i$, $\overline{M}w = \sum_{i=1}^{\infty} X_i \overline{M}w_i + \sum_{j=1}^{\infty} X_j \overline{M}w_j$, wherein $X_j$ represents the weight fraction of each low molecular weight component $j$;

$\overline{M}w_j$ represents the weight-average molecular weight of each component $j$; and $0.1 \leq f \leq 0.95$ and therefore wherein said terpolymers contain from 0.2 to 57 weight percent of said high molecular weight component and from 99.8 to 43 weight percent of said low molecular weight component.

18. The process of claim 17 wherein ethylene in the form of a gas is introduced into a pressure vessel containing said halogenated monomer in liquid form.

19. The process of claim 18 wherein said monomer is chlorotrifluoroethylene.

20. The process of claim 19 wherein said chain transfer agent is chloroform.

21. The process of claim 17 wherein a chain transfer agent is present during said initial contact and additional amounts of chain transfer agent are added during said contact between said mixture and said additional ethylene.

22. The process of claim 17 wherein said monomer is tetrafluoroethylene.

23. The process of claim 17 wherein said monomer is chlorotrifluoroethylene.

* * * * *